United States Patent

Maurer, III

[11] 3,871,648
[45] Mar. 18, 1975

[54] BICYCLE TRAVEL SIMULATOR

[76] Inventor: Robert A. Maurer, III, 140 E. Gorham St., Madison, Wis. 53703

[22] Filed: July 20, 1973

[21] Appl. No.: 381,146

[52] U.S. Cl. .................................. 272/73, 35/11
[51] Int. Cl. ............................................ A63b 69/16
[58] Field of Search... 272/73; 74/242.12, 242.14 R; 35/11

[56] References Cited
UNITED STATES PATENTS

| | | | |
|---|---|---|---|
| 581,835 | 5/1897 | Sturgis | 272/73 |
| 1,621,120 | 3/1927 | Lee | 272/73 |
| 2,263,438 | 11/1941 | Garvin | 74/242.14 R X |
| 3,118,315 | 1/1964 | Loosli | 74/242.12 |
| 3,362,243 | 1/1968 | Ferguson | 74/242.14 R |

FOREIGN PATENTS OR APPLICATIONS

| | | | |
|---|---|---|---|
| 607,313 | 3/1926 | France | 272/73 |
| 909,687 | 1/1946 | France | 74/242.12 |

Primary Examiner—Richard C. Pinkham
Assistant Examiner—R. T. Stouffer
Attorney, Agent, or Firm—Keith Schoff

[57] ABSTRACT

In a travel simulator for bicycles, adjustment structure for providing frame folding and lengthening and continuously variable frictional loading of the rollers. The frame supports a bicycle on rollers, wherein the resistance to turning of the rollers is adjustable. In this manner, the frame simulates the effort required to pedal a bicycle under conditions of actual bicycle travel. The frame comprises a pair of sections hinged together with turnbuckles. The anchors of the turnbuckles are connected to the sections in incremental settings to adjustably space the rollers in accordance with the wheel base of a bicycle to be ridden thereon. The turnbuckle itself provides for tensioning of a substantially non-extensible V-belt, which belt acts to interconnect a roller on one frame section with a roller on the other frame section.

5 Claims, 2 Drawing Figures

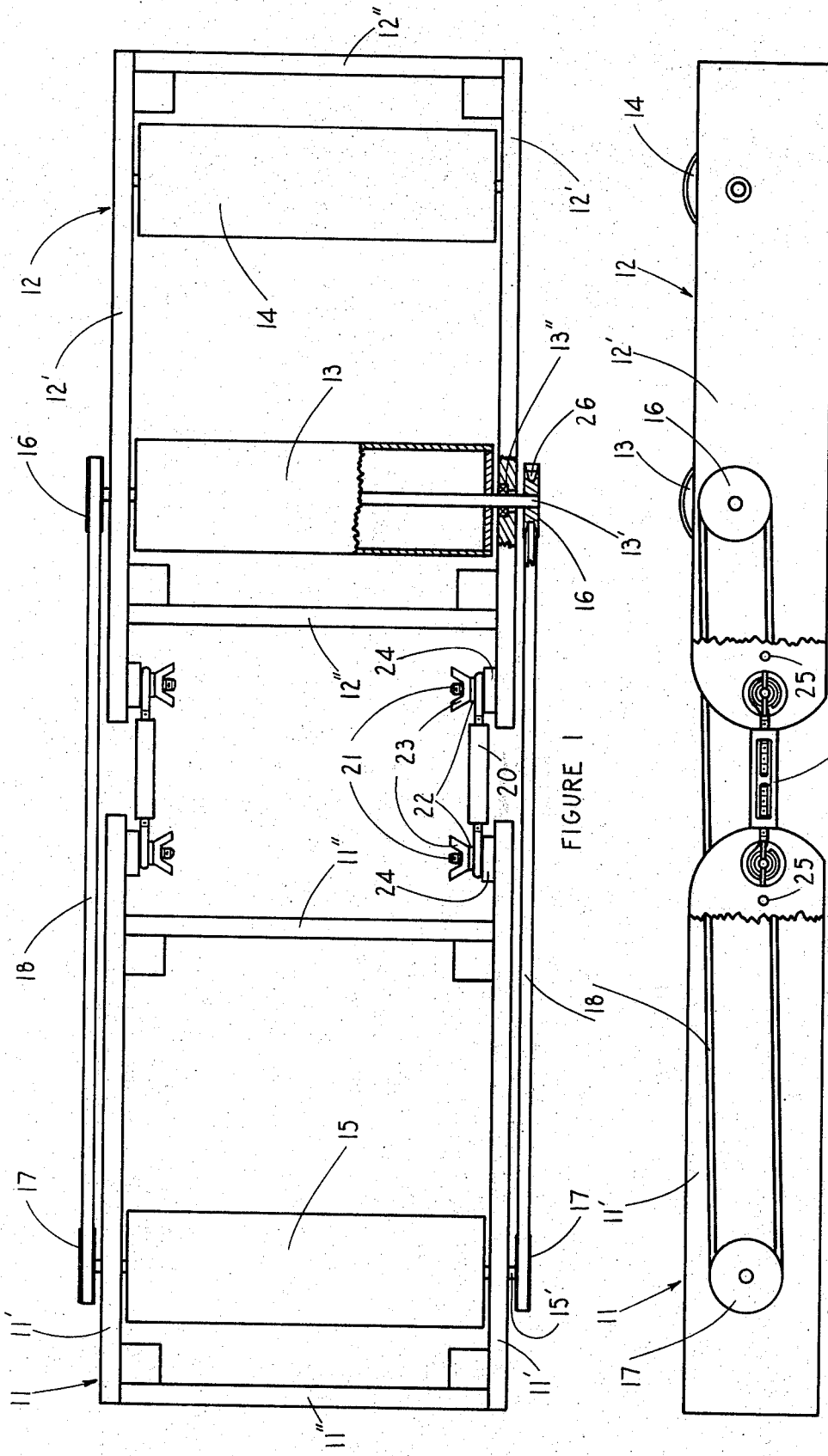

BICYCLE TRAVEL SIMULATOR

BACKGROUND OF THE INVENTION

Bicycle travel simulators conventionally comprise a rectangular horizontal frame in which three rollers are mounted transversely, two of them disposed near one end of the frame spaced about one foot apart and the third located near the other end of the frame. A bicycle can be ridden in place upon the rollers with the rear wheel cradled between the two spaced rollers and the front wheel riding on the third roller. The device is used by cyclists to train indoors for racing competition, or merely for exercise or enjoyment. Conventionally a resilient belt is placed around the front wheel support roller and one of the rear wheel support rollers so that the front wheel of the bicycle will be driven and steered, but without providing frictional loss beyond that inherent to the arrangement. Either the frame members may be telescoping or the rollers may be mounted at various locations in a fixed frame to provide adjustment to accomodate bicycles of different wheelbase lengths, and it is conventional for the frame to be hinged to facilitate folding and storage of the device.

SUMMARY OF THE INVENTION

This invention provides continuously adjustable resistance to turning of the rollers to provide pedalling effort required of a bicyclist which approximates actual conditions encountered during bicycle travel from wind flow, surface incline and rolling resistance. The means for providing such adjustment also serves to provide frame length adjustment and hinging of the frame and in a preferred embodiment comprises turnbuckles interconnecting separate frame sections a substantially non-extensible and V-belt and sheaves on the interconnected roller shafts. The turnbuckles are attached to the frame in accordance with the wheelbase of the bicycle to be used and the belt employed, and are expanded or contracted to provide greater or lesser belt tension and concomitant frictional loss to the belt running in the sheaves and effort required of the bicyclist to turn the rollers. The turnbuckles serve as well as hinges for folding the frame.

DESCRIPTION OF THE INVENTION

FIG. 1 is a plan view of the invention showing a portion of the invention in cross-section;

FIG. 2 is a side elevation of the device of FIG. 1 shown in partial cut-away.

In the figures frames components 11 and 12 are shown each respectively comprising side rails 11' and 12' and transverse rails 11'' and 12'' secured to provide two rigid box sections with side rails extensions as shown. Frame component 12 has rollers 13 and 14 operably mounted by bearings thereon, and frame component 11 has roller 15 similarly mounted thereon. Each roller may be about 4½ inches in diameter and may comprise an axle shaft such as shaft 13' for roller 13 which is mounted in bearing 13''. Shafts 13' and 15' of rollers 13 and 15, respectively carry sheaves 16 and 17 at each end as shown: the sheaves may be conventional V-belt sheaves having a transverse groove dimension at the root which is narrower than at the mouth and also less than the least width dimension of a belt which is run therein. Belts 18 are shown disposed operably interconnecting sheaves 16 and 17, and may comprise V-belt or other operable power transmission belt of round, hexagonal, or other cross-sectional configuration which may be run in sheaves 16 and 17 without riding in the root of the groove. Belt 18 may also be tubular and comprise polyurethane or other operable material which will operably provide requisite frictional contact with the walls of the grooves in the sheaves when disposed wedgelike therein. Roller 14 need not be belt connected and is not so shown, but may be so connected if desired or if greater frictional loss is desired than is conveniently obtained from sheaves 16 and 17. Conversely, one set of sheaves 16 and 17 only may be provided or belt connected, if so desired.

Frame components 11 and 12 are joined by means of turnbuckles 20 which are anchored to side rail member 11' and 12' by bolts 21, fitted with bushings 22 and wing nuts 23 together with spacers 24 to provide clearance from the side rails for convenient handling of the turnbuckles. An alternate set of holes 25 is provided for bolts 21 in side rail members 11' and 12' to provide incremental adjustability in the length of assembled frame components 11 and 12 to accomodate bicycles of substantially different wheel base lengths, usually a range of from 37 inches to 43 inches wheel base length being sufficient to accomodate nearly all adult bicycles.

Turnbuckles 20 provide means for variable, fine tensioning of belts 18 causing the belts to run at greater or lesser depths within the grooves of sheaves 16 and 17 but at all times making contact only with the tapered sidewalls of the grooves and not with the root, as is the manner customary for V-belt usage. Increasing the tension on belts 18 by turning turnbuckles in one direction forces belts 18 farther into grooves 26 thereby compressing the belt and increasing the frictional loading between the sidewalls of the grooves and the belt to produce greater frictional loss and provide greater resistance to turning of rollers 13 and 15 than when the belts are under less tension. Turning turnbuckles in the opposite direction reduces the tension on belts 18 and lessens the frictional loss and resistance to turning of the rollers while still causing roller 15 to be operably driven.

Frame components 11 and 12 can conveniently be swung into juxtaposition for compact storage by pivoting each component about bolts 21 passing therethrough with turnbuckle serving as a hinge for the purpose.

Other types of screw threaded adjustment devices may be substituted for turnbuckles 20, but none is preferred for use because the double-pivoting action provided by the turnbuckles provides the added advantage of enabling the frame components to be folded flat one upon the other: similarly adjustable bearing block means or the like can be substituted for fixed mounting of bearing 13, for example, to provide for adjustable tensioning of belts 18.

If desired sheaves 16 and 17 may be eliminated and comparable grooves be provided in rollers 13 and 15 to receive belt means, but such an expedient does not enable easy interchange of belts to be made as will be necessary to adjust the device for use with bicycles of substantially differing wheelbase lengths, and therefore is not preferred.

I claim:

1. In a bicycle travel simulator wherein frame supported bearing mounted rollers are provided upon which a bicycle can be ridden in place with a front wheel support roller being belt driven by a rear wheel support roller, an improvement comprising in combination, a. at least one peripheral groove unitary with each belt connected wheel support roller adapted to receive a power transmission belt wherein each said groove is wider at the mouth thereof than at the root, b. at least one substantially non-extensible endless power transmission belt of greater minimum width than the roots of said grooves operably disposed in said grooves supported wedgelike by the walls of said grooves radially distant from the roots of said grooves, said belt being structured to be compressed deeper within the grooves to substantially increase the operating frictional losses between the wall of said grooves and said belt when the spacing between said wheel support rollers is increased, c. first adjustment means anchorably connectible in incremental settings to said frame to adjustably space said belt connected wheel support rollers in accordance to the wheel base of a bicycle to be ridden thereon and second adjustment means biasable to variably tension said belt and the depth to which said belt is drawn into said grooves thereby to provide fine adjustment of the frictional loading between said belt and walls of said grooves and of the work expended in pedaling a bicycle thereon, to simulate the effort required to pedal a bicycle under conditions of actual bicycle travel.

2. The simulator of claim 1 wherein said second adjustment means for variably spacing said belt connected wheel continuously adjustable.

3. The simulator of claim 2 wherein said second means comprises screw thread adjustment.

4. The simulator of claim 2 wherein said second means comprises a turnbuckle.

5. The simulator of claim 4 wherein said turnbuckle comprises a hinge for folding said frame.

* * * * *

UNITED STATES PATENT OFFICE
CERTIFICATE OF CORRECTION

Patent No. 3,871,648           Dated  March 18, 1975

Inventor(s)   Robert A. Maurer, III

It is certified that error appears in the above-identified patent and that said Letters Patent are hereby corrected as shown below:

Column 1, line 34, after "sections" insert -- and --; line 35, cancel "and", first occurrence. Column 4, Claim 2, should appear as shown below:

-- 2. The simulator of claim 1 wherein said second adjustment means for variably spacing said belt connected wheel continuously adjustable. --.

Signed and Sealed this fourteenth Day of October 1975

[SEAL]

Attest:

RUTH C. MASON
Attesting Officer

C. MARSHALL DANN
Commissioner of Patents and Trademarks